Figure 1:
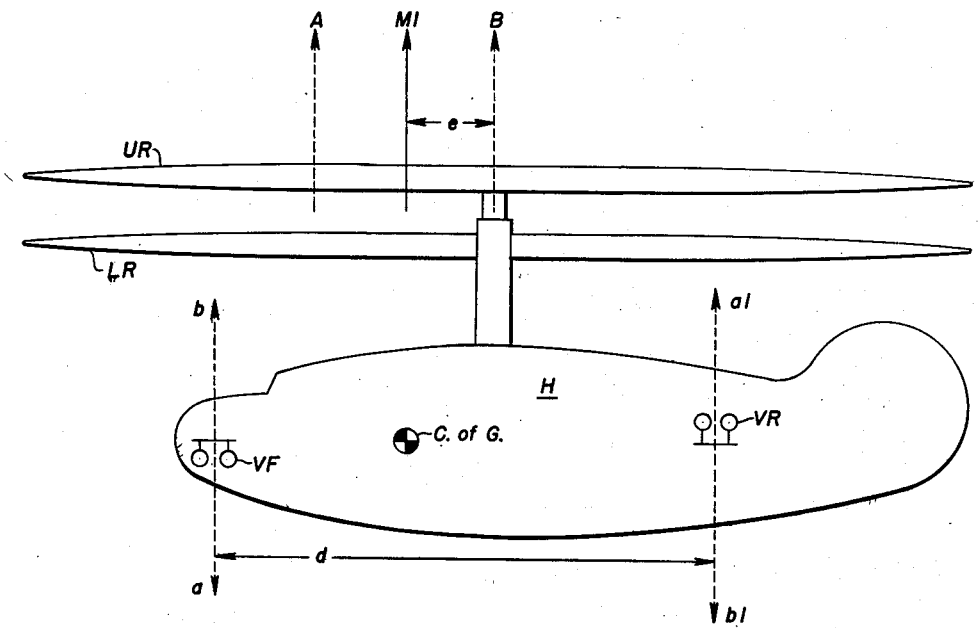

Sept. 23, 1952     A. F. DONOVAN     2,611,557

HELICOPTER ROTOR VIBRATION REDUCING MEANS

Filed June 8, 1948

Allen F. Donovan
*INVENTOR.*

BY *James M. Clark*

HIS PATENT ATTORNEY.

Patented Sept. 23, 1952

2,611,557

UNITED STATES PATENT OFFICE 2,611,557

HELICOPTER ROTOR VIBRATION REDUCING MEANS

Allen F. Donovan, Kenmore, N. Y., assignor to Curtiss-Wright Corporation, a corporation of Delaware Application June 8, 1948, Serial No. 31,695

8 Claims. (Cl. 244—17.11)

The present invention relates to the reduction of vibration in aircraft and more particularly to improvements in dynamic balance devices for rotative wing aircraft.

In Autogiros and helicopters having two-bladed rotors unbalance or vibration occurs whenever the center of gravity of the aircraft is either forward or aft of the axis of rotation of the rotor system. Under these conditions the average resultant lift on the rotor must necessarily pass through the center of gravity of the aircraft and must accordingly be spaced from the axis of rotation. When the rotor blade is fore and aft, the cyclic pitch control enables the pilot to increase the lift on one blade and decrease it on the other, thereby bringing the lift forward or rearward of the axis, as desired. However, when the rotor blade is crosswise, or transversely disposed, no such remedial action is possible and the lift must pass through the axis of rotation.

This problem of vibration due to gyroscopic couples with single rotation two-bladed propellers or rotors has caused considerable difficulty in the past in the design and operation of rotative wing aircraft, whether of the Autogiro or the helicopter type. These vibrations have been observed and measured in the past in connection with two-bladed Autogiros and helicopters and have produced very undesirable effects. The present invention encompasses the provision of a pair of counter-rotating rotors for either an Autogiro or a helicopter which eliminates much of the previously referred to troubles inasmuch as the opposite rotation of the two rotors results in opposite vibrating moments which will exactly cancel out each other. That is, for example, when a helicopter is banking one rotor will produce a nose-up moment twice per revolution, while the other rotor will produce an equal nose-down moment. So long as the two rotors are geared together to rotate at exactly the same speed, these moments can be made to cancel out each other and no vibration should be transmitted to the machine.

The blades themselves are also subjected to a gyroscopic vibration with a frequency equal to the rotor speed, or approximately one hundred and fifty cycles per minute in the average machine. If the rotor axis is stiff, that is, if its frequency is high compared to the R. P. M., it will not vibrate and no vibration from the gyroscopic forces will be transmitted to the fuselage. Due to the gyroscopic couples acting to bend a lower rotor blade tip up while the adjacently passing upper rotor tip is bent down, deflections will be produced which will tend to bring the rotors together during part of the revolution. These deflections will be determined by the stiffness of the blade and the rolling or pitching velocity of the helicopter. The separation between the two rotors must be sufficient to prevent blade interference when deflected by the most severe rolling velocity condition attainable in flight. An analogous condition is met with in fixed wing aircraft in the design of the wings and the tail surfaces to withstand a maximum rate of roll. Such vibrations from gyroscopic effects are accordingly greatly minimized in two-bladed rotor construction by means of the counter-rotating arrangement.

There is, however, another source of vibration with two-bladed rotors which has presented considerable difficulty. If, for example, as indicated above, the center of gravity, or C. of G., is ahead of the rotor axis, the pilot must apply cyclic pitch control to produce more lift over the front half of the rotor rotation than over the rear half. Obviously, when the two rotors are in the crosswise or transverse position, the rotor center of pressure cannot be forward of the axis of rotation, but must be coincident with it. Therefore, as the rotor rotates, the fore and aft center of pressure will shift from the rotor axis to directly over the C. of G., then to a position ahead of the C. of G., then back to the C. of G. again, and so forth. This oscillation of the rotor center of pressure twice per revolution will create an undesirable unbalance condition or vibration. For these reasons, the general rotative wing designs have proceeded more in the direction of three-bladed rotors for it is known that a rotor with three or more blades eliminates practically all vibrations due to this center of pressure travel. While studies have indicated that it is possible to design helicopter rotors with three blades of relatively smaller chord, the requirement that the diameter must remain the same presents certain structural difficulties and the weight is accordingly increased to some extent.

The undesirable vibrations referred to in conjunction with two-bladed rotors is overcome and substantially eliminated by the present invention embodying a dynamic balance system consisting of a set of counter-rotating unbalanced weights in the nose and tail of the aircraft to cancel out the unbalancing or vibrating forces. The unbalance of these weights is adjusted according to the distance of the C. of G. from the rotor axis and the weights are 180° out of phase so that the force from the one in front is upward when that from the one in the rear is downward. These weights are driven at twice the rotor speed in order that the moment which they produce about the C. of G. counter-balances that due to the travel of the rotor center of pressure during rotation. In addition, the present invention provides an arrangement for automatically changing the unbalance of the vibrators to compensate or correct for changes in the C. of G. of the aircraft.

It is, accordingly, a major object of the present invention to provide an improved means for reducing the vibration in two-bladed rotors for Autogiro and helicopter type aircraft. It is a further object to provide an improved helicopter rotor arrangement consisting of a pair of two-bladed counter-rotating rotors which do not develop disturbing unbalance under rotor lift travel conditions. A further object resides in the provision of a two-bladed rotative wing aircraft which is capable of being parked within a much smaller parking space than similar aircraft having three-bladed rotors.

Figure 2:
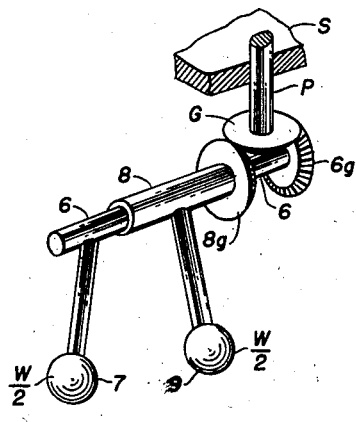

It is a further objective of the present invention to provide a dynamic balance system for vibrations developed due to fore and aft disparity between the C. of G. and the center of lift of a rotating wing aircraft in which the improved dynamic balance consists of sets of counter-rotating unbalanced weights disposed in the fore and aft portions of the aircraft. It is a still further objective to provide means for automatically adjusting the unbalance of the counter-rotating weights in accordance with the conditions encountered by the aircraft during flight. Other objects and advantages of the present invention will also occur to those skilled in the art after reading the present description considered in conjunction with the drawings forming a part hereof, in which:

Fig. 1 is a diagrammatic view of a helicopter of the two-bladed counter-rotating rotor type showing the forces developed in a form of the present invention; and Fig. 2 is a diagrammatic perspective view of a pair of counter-rotating weights comprising a form of vibrator which may be utilized in the arrangement shown in Fig. 1.

Referring now to Fig. 1, the letter H represents the fuselage of a helicopter having a two-bladed counter-rotating system comprising the upper rotor UR and the lower rotor LR. The center of gravity is indicated by the letters C. of G. somewhat forward of the vertical axis of rotation of the rotor system and the lift vector when the rotor is in the fore and aft position is at the point A and when the rotor is crosswise or transverse the lift vector is at the point B. This makes the average position of the lift, or the mean lift position MI, pass through the C. of G. and accordingly the machine remains horizontal in its average position. Under this condition, however, the machine vibrates in pitch with each shift of the lift, or two cycles per revolution. As a means of eliminating this condition and difficulty, vibrators VF and VR are installed where shown in the front and rear portions of the fuselage H.

These vibrators VF and VR are shown diagrammatically in Fig. 2, and consist essentially of weights 7 and 9 disposed on short levers supported from a pair of oppositely rotating co-axially disposed shafts. These weights are equal, each being one half of a predetermined weight W, and are each designated $$\frac{W}{2}$$

as shown. The inner shaft 6, which may be solid, has supported therefrom the weight 7, whereas the outer hollow shaft, or tube, 8 has supported therefrom the equal weight 9 which is caused to rotate in the opposite direction to that of the weight 7. These vibrators VF and VR will produce an oscillating couple equal to and opposite to that produced by the fore and aft movement of the lift vector between its positions A and B as shown in Fig. 1. In one form of the present invention the vibrators, for example, might consist of counter-rotating unbalanced weights as shown in Fig. 2 which are geared to the rotor shaft such that the vibrator shafts 6 and 8 rotate at twice the R. P. M. of the rotor. Thus, in Fig. 1, when the lift is at A, the vibrator VF in the forward portion of the aircraft would provide a corrective down force indicated by the letter $a$ while the vibrator VR in the rearward portion produces an up force indicated by the letter $a_1$. Similarly when the lift is at B or co-axial with the rotor axis, the front vibrator VF produces an up force $b$, when the rear vibrator VR produces a down force $b_1$. The line MI above the C. of G. represents the resultant lift or mean lift component resulting from the periodic lift vectors at A and B. The condition for vibration elimination would be that the vibrator force times the distance between the two vibrators must be equal to the weight of the machine times its distance from the rotor axis. That is, where the vibrator force might be represented by the letter F; the distance between the front and rear vibrators by the letter $d$; the total lift, or the weight of the machine by the letter L; and the distance of the C. of G. of the machine from the rotor axis by the letter $e$; then $$F \times d = L \times e$$

That this is a reasonable arrangement from a design standpoint will be apparent from the following calculations: Assume a 12,000 lb. helicopter with $e=6''$ and $d=20$ ft. or $240''$. Accordingly, the vibrator force $$F = \frac{6 \times 12,000}{240} = 300 \text{ lbs.}$$

For a rotor turning 150 R. P. M., or 2.5 R. P. S., the size of the vibrator can be assumed to weigh approximately 11 lbs. This 11 lbs. would be divided as 5.5 lbs. in each weight $$\frac{W}{2}$$

of the counter-rotating sections 7 and 9 of each vibrator. The total installation for the helicopter would be 22 lbs., or 11 lbs. each for the front and rear vibrators, and to this, of course, is added the weight for the drive shafting, etc. Since the C. of G. position varies from flight to flight, provision is incorporated in each vibrator for varying the vibrator force, preferably by increasing or decreasing the length of the arms of the rotating weights. This may either be done manually, or automatically through the use of a vibration pick-up to indicate the magnitude and size of the vibration, and thereby adjust the unbalance to minimize it.

It will, accordingly, be seen that a simple and adequate system is provided for automatically maintaining the vibrator oscillating couples both opposite and equal to those produced by the lift vector motion, or shift during changing conditions. Initially, the mean position of the lift force vector must pass through the C. of G. in steady flight except for aerodynamic pitching moments on the fuselage. If fuselage pitching moments are neglected, it is immediately apparent that failure of the average position of the lift force to pass through the C. of G. will cause the helicopter to pitch either nose-up or nose-down. The pilot may correct this by applying the regular helicopter controls to bring the average lift vector back to the point where it passes through the C. of G. If the effect of the fuselage aerodynamic moment is considered, it will be recognized that the present means is still adequate and effective for its intended purposes. The pitching moment of the fuselage is proportional to the velocity squared and it is equivalent in its effect to a shift of the helicopter C. of G.; that is, the aerodynamic pitching moment on the fuselage makes the helicopter C. of G. act as though it were shifting slightly from its true position. Inasmuch as the present invention incorporates features to account for or correct C. of G. shifts, it can equally account for real or apparent C. of G. position movements.

A further effect of importance which has a bearing on the advantages and desirability of the present dynamic balancing system, is the change in downwash distribution with velocity in forward flight. As the helicopter picks up forward speed, several different downwash régimes are encountered which affect the magnitude of the lift vector oscillation. Thus, even with a constant C. of G. position, variation in the forward speed will result in the amplitude of the shift of the lift vector during a revolution varying over the helicopter speed range. This change in amplitude of the lift vector oscillation is automatically counterbalanced in the disclosed system by an increase or decrease in unbalance of the rotating weights. Thus, the disclosed system is such that the vibrations from the aerodynamic pitching moment of the fuselage, changes in vibration due to downwash effects, together with any other similar effects, are automatically counterbalanced by the present system. As described above, the automatic system for accomplishing this result consists of the vibration pick-ups which are mounted in the fore and aft portions of the fuselage and the output of each of which is rectified by the commutators on the helicopter rotor shaft. The polarity of the resulting voltage then indicates whether the vibrator unbalance should be increased or decreased and this voltage is used to control the amplifier which in turn controls suitable electric motor means for setting the vibrator unbalance.

Other forms and modifications of the present invention both with respect to its general arrangement and the details of its several parts are intended to fall within the scope and spirit of this invention as more particularly defined in the appended claims.

I claim:

1. In an aircraft, a fuselage, a two-bladed lift rotor for the support of said fuselage, power means for driving said lift rotor on an axis of rotation of said rotor spaced from the center of gravity of the aircraft thereby subjecting said fuselage to oscillatory couples, vibration producing means including oppositely rotating weights having a rotational axis disposed within said fuselage within the plane of the said lift rotor axis and the center of gravity of the aircraft, and drive means for actuating said vibration producing means at a speed of rotation of twice the speed of rotation of said lift rotor, the rotation of said weights being so phased as to produce couples which counter-balance the oscillatory couples to which said fuselage is subjected by said rotor.

2. In a helicopter having a two-bladed rotor, said rotor having an axis of rotation displaced longitudinally with respect to the center of gravity of the helicopter but lying in the same substantially vertical plane therewith, power means for driving said rotor thereby inducing disturbing oscillating couples in said helicopter due to said longitudinal displacement of said axis with respect to said center of gravity, means including oppositely rotating weights rotatable about an axis lying in said vertical plane for producing oscillating couples for the dynamic balancing of the oscillating couples induced as a result of said longitudinal displacement, and drive means for rotating said weights in phase with and at the same frequency as the frequency of said disturbing oscillating couples.

3. In a helicopter, a lift rotor system comprising a pair of two-bladed rotor units, power means for driving said rotor units in opposite directions about a common vertical axis of rotation, the loading of said helicopter causing its center of gravity to be located at a position displaced with respect to the axis of said lift rotor system, said displacement in relationship between the center of gravity and said axis of rotation inducing disturbing oscillating couples within said helicopter, means for counter-balancing said oscillating couples including oppositely rotating weights having an axis of rotation extending longitudinally of the helicopter and defining with said axis of lift rotor rotation a substantially vertical plane which includes the center of gravity of the helicopter, means to rotate said weights at a rotational speed equal to the frequency of the disturbing oscillating couple and phased so as to produce an oscillating couple opposed to said disturbing couple.

4. In a helicopter, a fuselage, a rotor system comprising a pair of two-bladed counter-rotating lift rotors for the support of said fuselage, power means for rotating said rotors upon a fixed axis, said fuselage having a center of gravity displaced with respect to said rotor system axis causing disturbing oscillating couples within said fuselage, compensating means for cancelling out said disturbing oscillating couples including oppositely rotating weights disposed on opposite sides of the axis of rotation of said rotor system upon a longitudinal axis of rotation included within the vertical plane of said rotor system axis and said center of gravity for inducing compensating oscillating couples within said fuselage which are equal in frequency and timing and opposite in direction to those couples produced by said rotor system due to said displacement in the center of gravity of the helicopter.

5. In a helicopter, a two-bladed lifting rotor, power means for driving said rotor about a substantially vertical axis, the center of gravity of the helicopter being subject by loading conditions to longitudinal displacement from said rotor axis causing disturbing oscillating couples to be produced in the helicopter by said rotor operation, said disturbing oscillating couples occurring twice during each revolution of said rotor as said rotor passes through its longitudinal position at which its lift vector is longitudinally displaced from both said axis of rotation and said center of gravity, compensating oscillating couple producing means including weights oppositely rotatable on a longitudinal axis lying within the substantially vertical plane defined by said axis of rotor rotation and said center of gravity of the helicopter, means for driving said rotatable weights at twice the speed with respect to said rotor arranged for inducing compensating oscillating couples of equal magnitude and opposite direction at the instances of occurrence of the disturbing oscillating couples within said helicopter caused by the rotation of said rotor.

6. In a helicopter, a lift rotor system comprising a plurality of blade units, power means for driving said blade units about a fixed vertical axis of rotation, said helicopter being subjected to variable loading conditions causing displacement of its center of gravity to a position longitudinally of the axis of rotation of said lift rotor system, said longitudinal displacement of the center of gravity with respect to said axis of rotation causing undesired oscillating couples to be induced within said helicopter, means for damping said oscillating couples including oppositely rotating weight means disposed longitudinally with respect to said center of gravity and having an axis of rotation extending longitudinally of the helicopter and defining with said axis of lift rotor rotation a substantially vertical plane which includes the center of gravity of the helicopter, said rotating weight means driven at a speed of rotation twice the speed of said blade units for producing compensating oscillating couples equal in magnitude and opposite in direction to the undesired oscillating couples induced by said rotor for automatically damping said rotor induced oscillating couples.

7. In a helicopter, a fuselage, a two-bladed lift rotor for the support of said fuselage, power means for driving said lift rotor on an axis of rotation of said rotor spaced rearwardly of the center of gravity of the helicopter subjecting said fuselage to undesired oscillatory couples, means including a pair of oppositely rotating weights disposed within said fuselage for producing compensating oscillatory couples, said weights having a rotational axis extending longitudinally of the fuselage and disposed within the general vertical plane defined by said lift rotor axis and the center of gravity of the fuselage, and drive means for rotating said weights at twice the speed of rotation of said rotor, and timing means associated with said drive means for initiating counter-balancing forces for producing compensating couples in phase and opposite in direction to those produced by said rotor about said center of gravity for damping said undesired oscillatory couples.

8. In an aircraft, lift rotor means rotatably mounted upon said aircraft, the loading of said aircraft causing relocation of its center of gravity to a position forward of the axis of rotation of said lift rotor means, power means for imparting rotation to said lift rotor means causing periodic relocation in the center of pressure of said lift rotor means from its axis of rotation to a position forward of the center of gravity of said aircraft, means for counter-balancing unbalancing oscillating couples initiated by said center of pressure relocation comprising at least two weights arranged to rotate in opposite directions, said weights arranged to rotate upon an axis of rotation lying in the plane determined by the axis of rotation of said lift rotor means and the center of gravity of the aircraft, means to rotate said weights at a rotating speed equal to the frequency of said disturbing oscillating couples, and means for phasing said rotation of said weights for producing oscillating couples opposed to said disturbing oscillating couples.

ALLEN F. DONOVAN.

REFERENCES CITED

The following references are of record in the file of this patent:

UNITED STATES PATENTS

| Number | Name | Date |
|---|---|---|
| 989,958 | Frahm | Apr. 18, 1911 |
| 2,394,513 | Chappedelaine | Feb. 5, 1946 |
| 2,418,407 | Hays | Apr. 1, 1947 |